(12) United States Patent
Chen et al.

(10) Patent No.: US 7,408,710 B2
(45) Date of Patent: Aug. 5, 2008

(54) POLARIZER DEVICE ADAPTED TO POLARIZED LIGHT

(75) Inventors: Hsu-Hung Chen, Sanchong (TW); Maw-Lin Hsu, Dongshan Township, Yilan County (TW); Hsin-Hung Lee, Fongshan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/796,103

(22) Filed: Apr. 25, 2007

(65) Prior Publication Data

US 2008/0049318 A1    Feb. 28, 2008

(30) Foreign Application Priority Data

Aug. 25, 2006   (TW) .............................. 95131470 A

(51) Int. Cl.
 *G02B 5/30*  (2006.01)
 *G02C 7/12*  (2006.01)
(52) U.S. Cl. ................ 359/485; 359/490; 359/501; 351/49

(58) Field of Classification Search ................ 359/490, 359/500, 501, 813, 819, 822, 485, 491, 492; 351/49

See application file for complete search history.

(56) References Cited

U.S. PATENT DOCUMENTS

| | | | | | |
|---|---|---|---|---|---|
| 2,057,855 | A | * | 10/1936 | Stayman | 351/109 |
| 2,310,623 | A | * | 2/1943 | Estey | 356/367 |
| 3,549,259 | A | * | 12/1970 | Klatchko | 356/366 |
| 3,751,139 | A | * | 8/1973 | Malherbe | 359/822 |
| 3,758,217 | A | * | 9/1973 | Stokstad | 356/256 |
| 4,117,341 | A | * | 9/1978 | Persson | 250/559.29 |
| 4,522,474 | A | * | 6/1985 | Slavin | 351/203 |
| 5,046,850 | A | * | 9/1991 | Tomoff | 356/367 |
| 5,128,808 | A | * | 7/1992 | Dosaka | 359/821 |

* cited by examiner

*Primary Examiner*—Ricky D Shafer
(74) *Attorney, Agent, or Firm*—Reed Smith LLP; Stanley P. Fisher, Esq.; Juan Carlos A. Marquez, Esq.

(57) ABSTRACT

The invention provides a polarizer device. The polarizer device according to the invention is adapted to a polarized light having an electric field direction. In particular, the polarizer device according to the invention enables the polarizer to be automatically adjusted to a proper viewing angle.

5 Claims, 3 Drawing Sheets

POLARIZER DEVICE ADAPTED TO POLARIZED LIGHT

BACKGROUND OF THE INVENTION

1. Field of the Invention

The invention relates a polarizer device which is adapted to a polarized light having an electric field direction. Particularly, the invention relates to a polarizer device which enables the polarizer to be automatically adjusted to a proper viewing angle.

2. Description of the Prior Art

Before outputting, the images from a 3D screen first pass through a polarizer. The polarizer separates in advance the images that will reach the eyes into two polarized lights that are perpendicular to each other. In other words, if the direction of a polarized light of the image is horizontal, the direction of another polarized light is vertical. Correspondingly, the polarized glasses worn on an user also has two polarizers, one on the left and the other on the right, to receive images with different polarized directions respectively. If the left frame of the polarized glasses is configured to be a horizontal polarizer, the horizontal polarizer will only allow images with horizontal polarized direction to pass through and block images with vertical polarized direction. Similarly, if the right frame of the polarized glasses is configured to be a vertical polarizer, the vertical polarizer will only allow images with vertical polarized direction to pass through and block images with horizontal polarized direction. The images with different polarized directions which are respectively received by the left eye and the right eye will generate parallax and form 3D images in the brain. In theory, the action of a polarizer is described as above. In practice, a pose or an action of the head of a person will form different angles between each polarizer and the polarized images which leading to light leak and color shift. In other words, the polarized glasses must match the screen. When the polarized lights which are outputted from the screen are in vertical direction and horizontal direction, the angle of the lens of the polarized glasses must match the directions of the polarized lights.

However, all the polarizer devices for viewing 3D images nowadays can not automatically adjust the tilt of the polarizer. That is to say, when the angle of the polarizer device used by an user tilts left or right, the eyes of the user will not receive the images in vertical direction or in horizontal direction correctly, thus interfering the information received by the left eye and right eye.

Accordingly, one scope of the invention is to provide a polarizer device which enables the polarizer to be automatically adjusted to a proper viewing angle.

SUMMARY OF THE INVENTION

According to a preferred embodiment, the polarizer device of the invention is adapted to a polarized light which has an electric field direction. The polarizer device includes a first frame, a second frame, and a polarizer. The first frame is configured to be engaged to an object or to be worn on the face of a person. The second frame is rotatably engaged to the first frame, and the second frame thereof defines a horizontal central line and a vertical central line. The polarizer is mounted on the second frame and has a light passing direction, wherein the second frame has a center of gravity located at a position which is on the vertical central line but lower the horizontal central line of the second frame. The position of the center of gravity is stationary relative to the horizontal central line and the vertical central line such that the horizontal central line of the second frame is kept parallel to a ground level due to the action of the center of gravity, even if the first frame is tilted. In other words, the light passing direction of the polarizer is still parallel to the electric field direction of the polarized light.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a polarizer device. Particularly, the polarizer device enables the polarizer to be automatically adjusted to a proper viewing angle. The preferred embodiments of the invention will be described in detail below, so as to well describe the features, the spirits, the advantages, and the easiness of putting the invention into practice.

Figure 1:
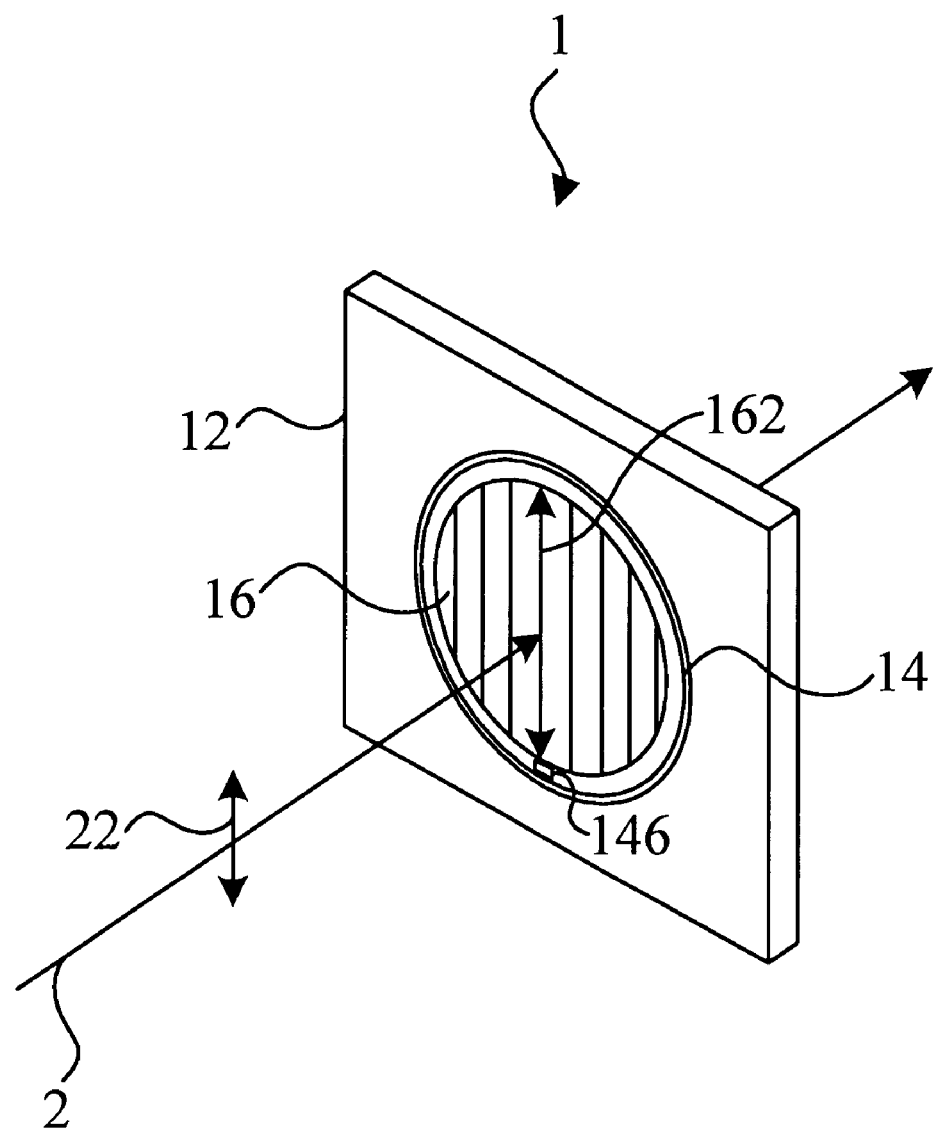
FIG. 1 is a schematic diagram illustrating a polarizer device and a polarized light which is adapted to the polarizer device.
Figure 2:
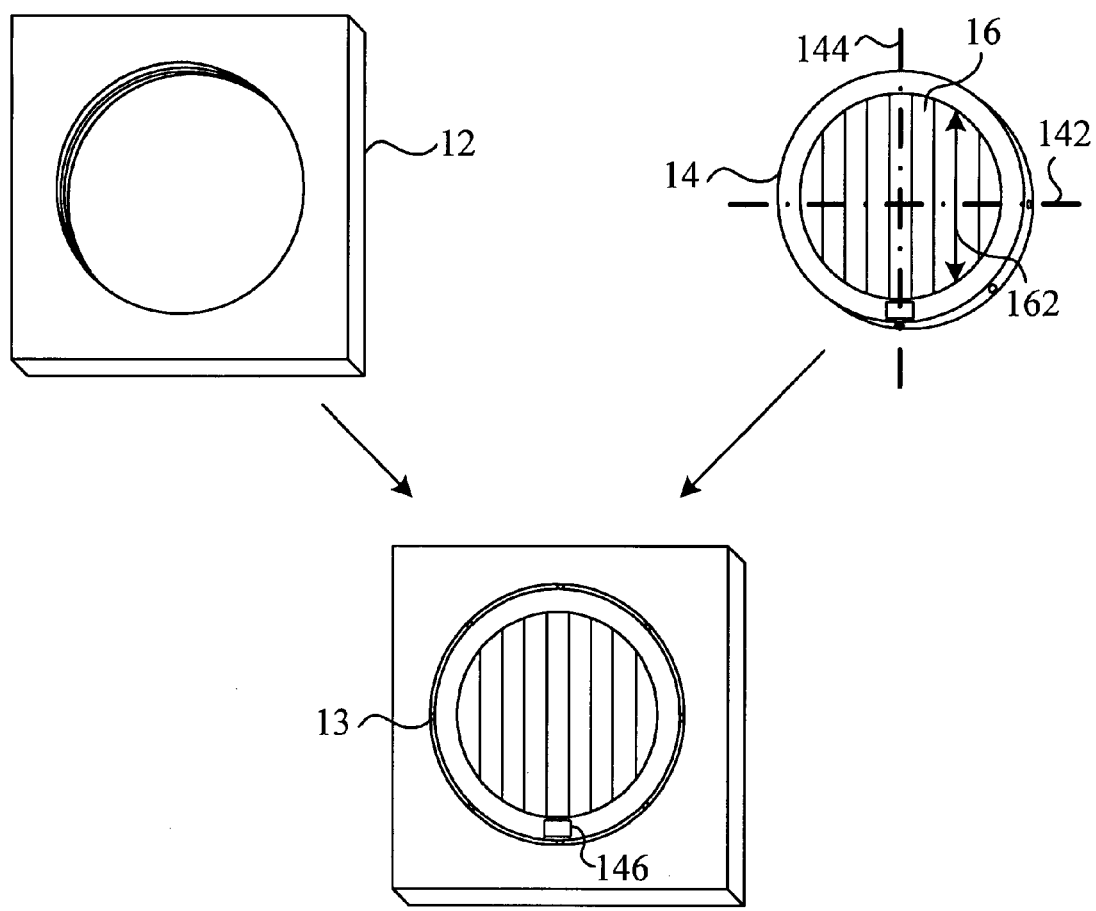
FIG. 2 is a schematic diagram illustrating the structure of a polarizer device according to a preferred embodiment of the invention.

Referring to FIG. 1, FIG. 1 is a schematic diagram illustrating a polarizer device 1 and a polarized light 2 which is adapted to the polarizer device 1. As shown in FIG. 1, the polarizer device 1 is adapted to a polarized light 2 which has an electric field direction 22. Referring to FIG. 2, FIG. 2 is a schematic diagram illustrating the structure of a polarizer device 1 according to a preferred embodiment of the invention. As shown in FIG. 2, the polarizer device 1 includes a first frame 12, a second frame 14, and a polarizer 16. The first frame 12 is configured to be engaged to an object (such as a camera lens of the instrument for measuring 3D displaying apparatus) or to be worn on the face of a person (i.e. to be worn to view 3D images). The second frame 14 is rotatably engaged to the first frame 12, and the second frame 14 thereof defines a horizontal central line 142 and a vertical central line 144. The polarizer 16 is mounted on the second frame 14 and has a light passing direction 162.

Figure 3:
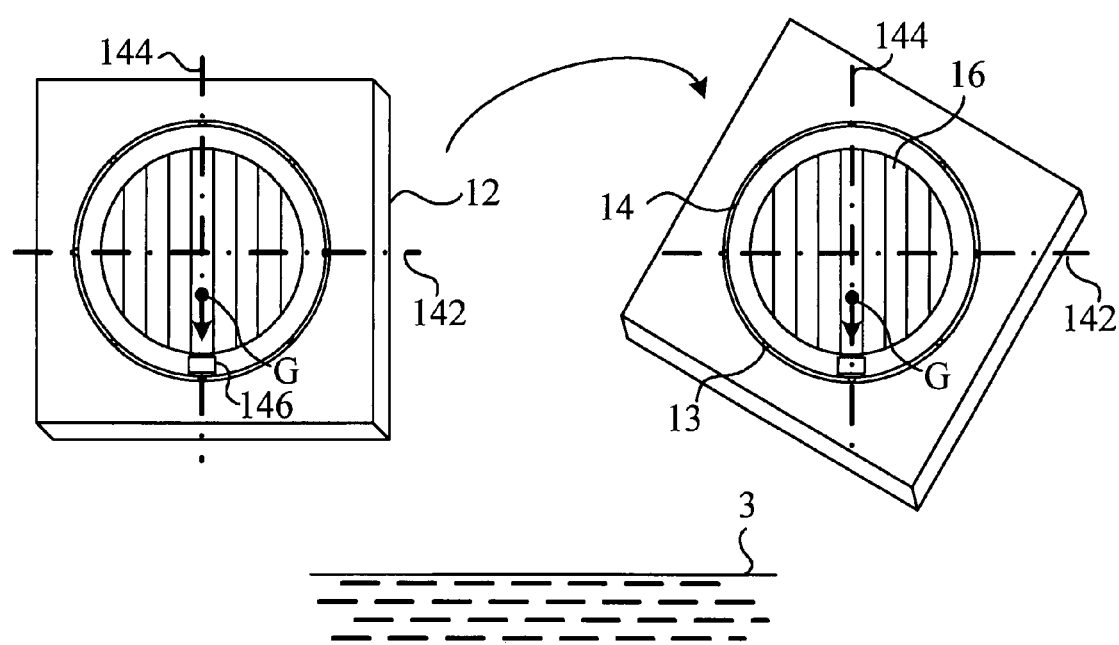
FIG. 3 is a schematic diagram illustrating the tilt of the polarizer device according to a preferred embodiment of the invention.

Referring to FIG. 3, FIG. 3 is a schematic diagram illustrating the tilt of the polarizer device 1 according to a preferred embodiment of the invention. As shown in FIG. 3, the second frame 14 has a center of gravity G located on the vertical central line 144 but lower the horizontal central line 142 of the second frame 14. The position of the center of gravity G is stationary relative to the horizontal central line 142 and the vertical central line 144 such that the horizontal central line 142 of the second frame 14 is kept parallel to a ground level 3 due to the action of the center of gravity G, even if the first frame 12 is tilted. In other words, the light passing direction 162 of the polarizer 16 is still parallel to the electric field direction 22 of the polarized light 2.

As shown in FIG. 2, in order to let the second frame 14 smoothly and rotatably engage to the first frame 12, the second frame 14 is rotatably engaged to the first frame 12 by using of a bearing 13. In the embodiment, the bearing 13 is a ball bearing.

Besides, in another preferred embodiment, the bearing 13 can also be a roller bearing, a hydraulic bearing, or other similar device.

As shown in FIG. 3, in order to let the light passing direction 162 of the polarizer 16 ceaselessly parallel to the electric field direction 22 of the polarized light 2, at least one weight 146 can be placed in the second frame 14. In other words, the invention is able to make the center of gravity G located at the position on the vertical central line 144 but lower the horizontal central line 142 of the second frame 14 by placing the at least one weight 146 on the second frame 14. It is notable that the quantity and the placing positions of the at least one weight 146 depend on the practical application.

In another preferred embodiment, the at least one weight 146 can be a thin film which is coated on the second frame 14.

Comparing with the prior art, the polarizer device according to the invention is able to automatically adjust the polarizer to a proper viewing angle and prevent light leak and color shift caused by the tilt of the polarizer.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A polarizer device adapted to a polarized light having an electric field direction, said polarizer device comprising:

a first frame configured to be engaged to an object or to be worn on the face of a person;

a second frame, rotatably engaged to the first frame, the second frame thereof defining a horizontal central line and a vertical central line; and a polarizer, mounted on the second frame, the polarizer having a light passing direction, wherein the second frame has a center of gravity located at a position on the vertical central line but lower than the horizontal central line of the second frame, the position of the center of gravity is stationary relative to the horizontal central line and the vertical central line such that the horizontal central line of the second frame is kept parallel to a ground level due to the action of the center of gravity, even when the first frame is tilted.

2. The polarizer device of claim 1, wherein the second frame is rotatably engaged to the first frame by using of a bearing.

3. The polarizer device of claim 2, wherein the bearing is one selected from the group consisting of a ball bearing, a roller bearing and a hydraulic bearing.

4. The polarizer device of claim 1, wherein the center of gravity is located at the position on the vertical central line but lower than the horizontal central line of the second frame by using of at least one weight placed in the second frame.

5. The polarizer device of claim 4, wherein one of the at least one weight is a thin film coated on the second frame.

* * * * *